L. SCHRIEVER.
LUBRICATOR.
APPLICATION FILED JUNE 12, 1908.

No. 914,757.

Patented Mar. 9, 1909.
3 SHEETS—SHEET 1.

WITNESSES

INVENTOR
BY
ATTORNEY

L. SCHRIEVER.
LUBRICATOR.
APPLICATION FILED JUNE 12, 1908.

914,757.

Patented Mar. 9, 1909.
3 SHEETS—SHEET 2.

WITNESSES
Arthur E. Gumpre.
W. R. Schulz.

INVENTOR
Lüder Schriever
BY
ATTORNEY

L. SCHRIEVER.
LUBRICATOR.
APPLICATION FILED JUNE 12, 1908.

914,757.

Patented Mar. 9, 1909.
3 SHEETS—SHEET 3.

WITNESSES
Arthur E. Zumpe.
W. R. Schulz.

INVENTOR
Lüder Schriever
BY
Frank O. Briesen
ATTORNEYS

UNITED STATES PATENT OFFICE.

LÜDER SCHRIEVER, OF BREMEN, GERMANY.

LUBRICATOR.

No. 914,757.　　　Specification of Letters Patent.　　　Patented March 9, 1909.

Application filed June 12, 1908. Serial No. 438,023.

*To all whom it may concern:*

Be it known that I, LÜDER SCHRIEVER, a citizen of Germany, residing at Bremen, Germany, have invented new and useful Improvements in Lubricators, of which the following is a specification.

This invention relates to a lubricator which is so constructed that measured regulable quantities of the lubricant are automatically liberated and discharged at selected intervals.

Figure 1:
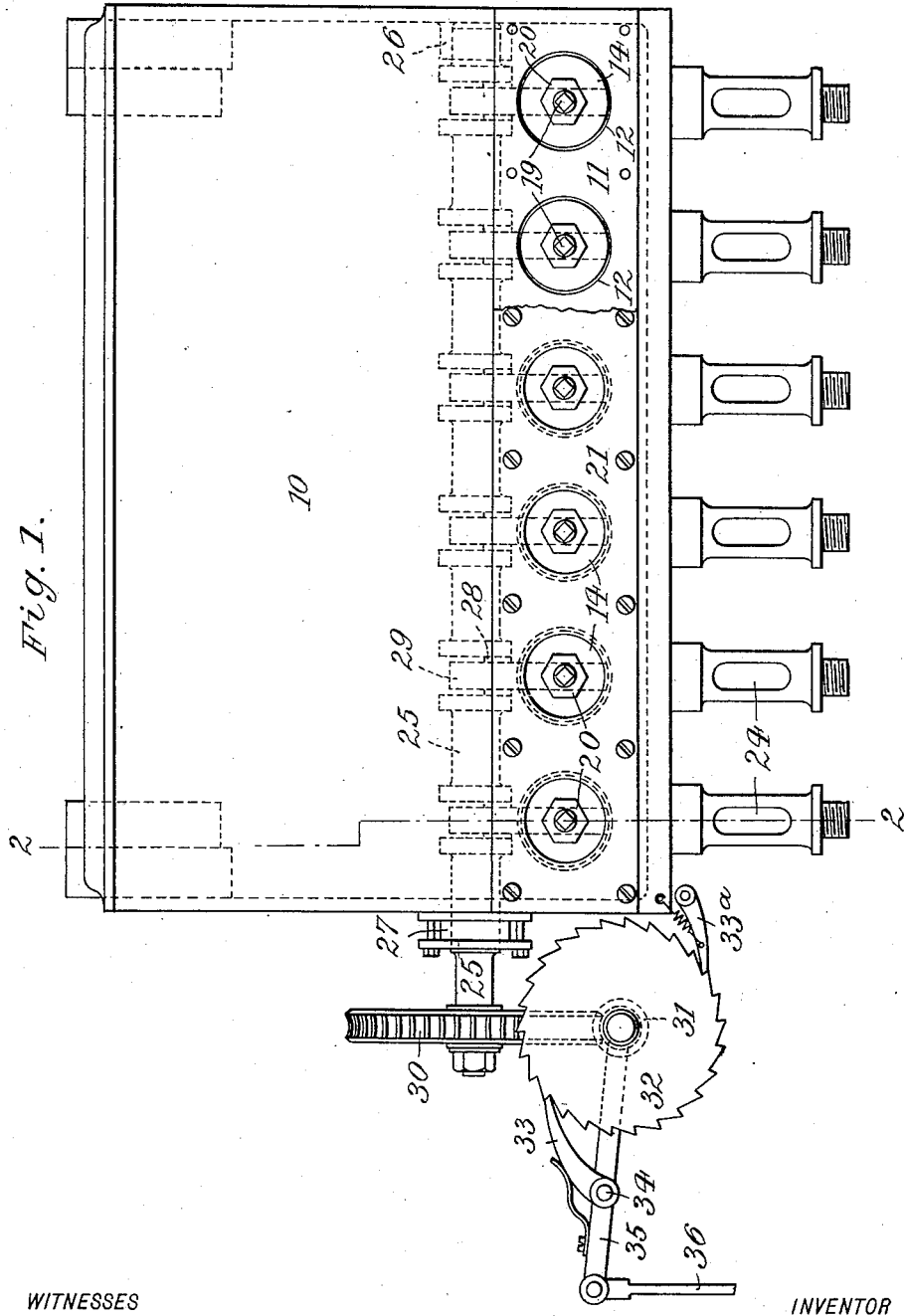
Figure 2:
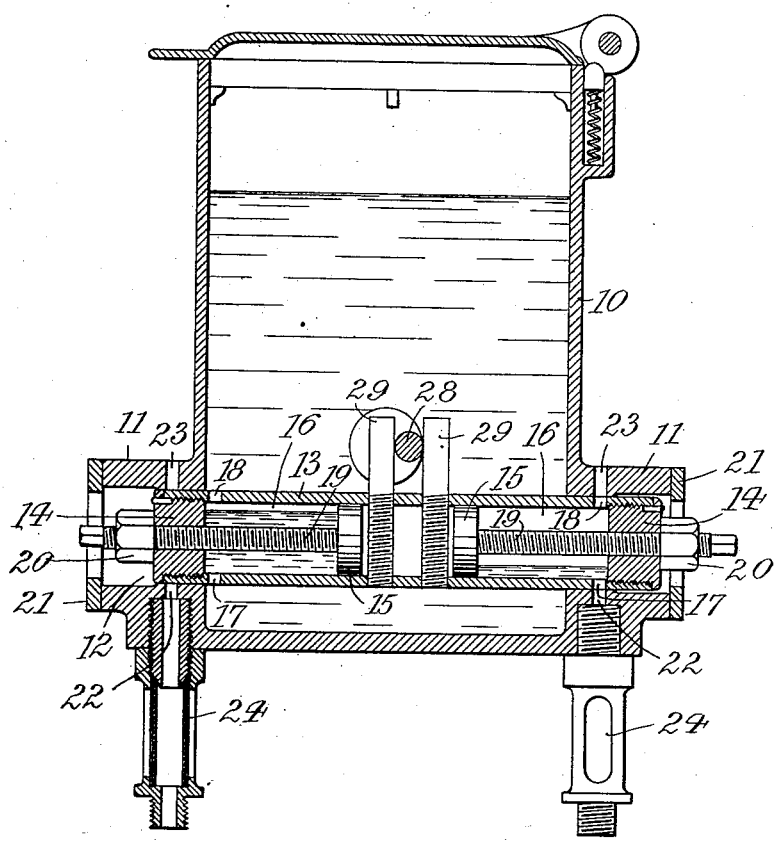
Figure 3:
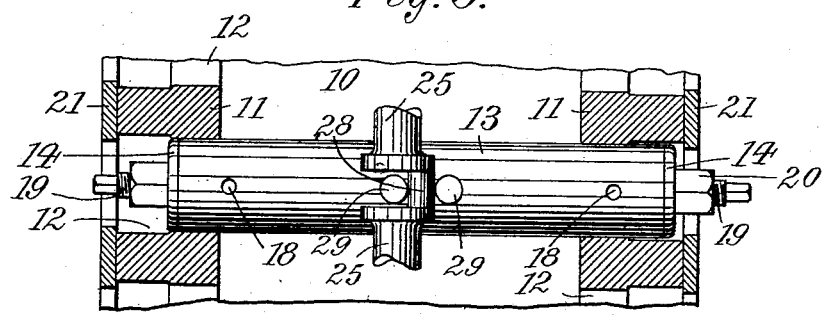
Figure 4:
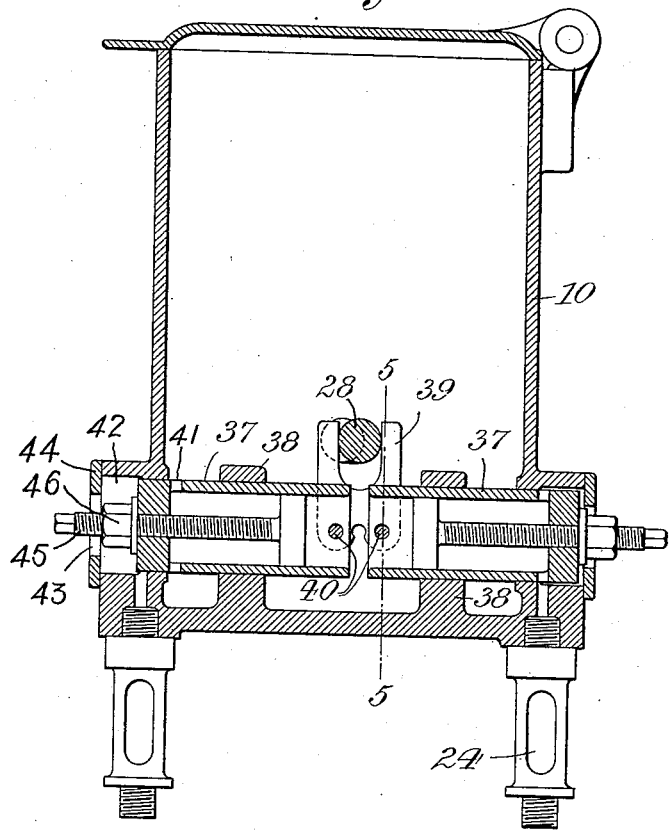

In the accompanying drawings: Figure 1 is a front elevation, partly broken away, of my improved lubricator; Fig. 2 a vertical cross section on line 2—2, Fig. 1; Fig. 3 a detail of one of the hollow plungers and adjoining parts; Fig. 4 a cross section of a modification of the lubricator, and Fig. 5 a section on line 5—5, Fig. 4.

The oil reservoir 10 is provided near its bottom with lateral extensions or bosses 11 provided with alined openings 12. Reservoir 10 is traversed by a number of hollow plungers 13, shown to be cylindrical in form, each plunger engaging with its ends a pair of opposed openings 12. Plunger 13 is closed by heads 14, and is divided by a pair of pistons 15 into two axially alined pockets 16, each of said pockets being provided near its outer end with an oil duct 17 and a vent 18. In order to regulate the capacity of pocket 16, piston 15 may be set at different distances from head 14 by means of a threaded stem 19 engaging a tapped perforation in head 14. Stem 19 carries a jam nut 20, and its outer end, which passes through a perforated cover 21, is squared, so that the stem may be turned by a key.

Extension 11 is provided with a lower oil duct 22 and an upper vent or air inlet 23, so that when opening 17 communicates with duct 22, opening 18 communicates with the outer air. Duct 22 communicates, by observation glass 24, with the usual oil tube, (not shown), leading to the bearing, etc., to be lubricated.

Means are provided for imparting such an intermittent reciprocating movement to plunger 13 that it dwells at the ends of its stroke, so that when the openings 17, 18, of one of its pockets 16, communicate with the interior of reservoir 10, the openings 17, 18, of the companion pocket will communicate with the ducts 22, 23. Thus, when say the left end of plunger 13 has arrived at its inward position, oil will flow into left pocket 16 through duct 17, while the air will escape through vent 18. When the left end of the plunger has arrived at its outward position, the oil entrapped in left pocket 16 will now be discharged through ducts 17, 22, while air is admitted through vents 23, 18. Thus, while one pocket is being charged, the other pocket is correspondingly emptied, and vice versa, as will be readily understood.

The means for imparting the desired intermittent reciprocating movement to plunger 13, are as follows: In reservoir 10 is journaled, at right angles to plungers 13, a rotatable crank-shaft 25 stepped in bearing 26 and passing through a stuffing box 27. Shaft 25 is provided above each plunger 13 with a crank 28 playing between a pair of pins or abutments 29 that extend upwardly from plunger 13. Fast on shaft 25 is a worm wheel 30 engaged by worm-shaft 31 carrying ratchet wheel 32. Wheel 32 is engaged by a spring pawl 33 pivoted at 34 to a lever 35 which turns on shaft 31. To lever 35 is pivoted a rod 36 that receives reciprocating movement in suitable manner from the machine to be lubricated. By altering the stroke of this rod, the number of teeth on wheel 32 taken along by pawl 33, on each up-stroke, may be changed, so that the velocity of intermittent partial rotation of shaft 25, and consequently the speed of plungers 13, may be regulated. A detent 33ª holds ratchet wheel 32 against reverse movement.

It is obvious that the above described means for imparting the desired intermittent reciprocating movement to plungers 13, may be varied without departing from the spirit of the invention.

Figure 5:
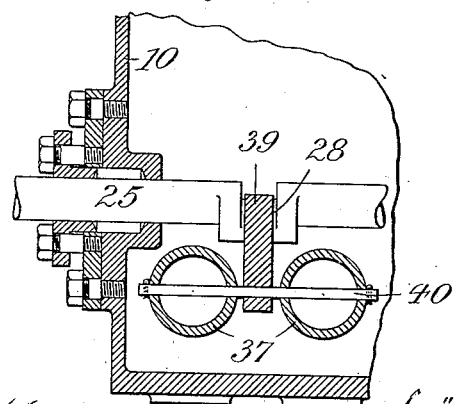

In Figs. 4 and 5, two separate alined plungers 37 are used, in lieu of the continuous plunger shown in Fig. 3, said plungers being guided by bearings 38 of reservoir 10. The upper plunger openings 41 are adapted to communicate with the enlarged outer sections of the boss perforations 42. The latter, in turn, communicate with the air by the openings 43 formed in covers 44, which, at the same time, serve to accommodate threaded stems 45 and nuts 46. The crank-shaft 25 engages a fork 39 secured to pins 40 that connect two adjoining pair of plungers 37. In this way, each crank 28 will simultaneously actuate two sets of plungers.

It will be seen that by the construction described, a regulable quantity of the lubricant is first entrapped in the plunger and is then conveyed, more or less quickly, to the discharge outlet. In this way the lubricator will automatically supply the machine with a given quantity of lubricant at given intervals of time, thus performing the lubricating operation in an economical and reliable manner.

I claim:

1. A lubricator, comprising an oil reservoir, a hollow plunger slidable therein and having an upper opening and a lower opening, an outlet duct, and means for reciprocating the plunger, whereby either both openings communicate with the oil reservoir, or the lower opening communicates with the outlet duct, while the upper opening communicates with the outer air, substantially as specified.

2. A lubricator, comprising an oil reservoir, a hollow plunger slidable therein and having an upper opening and a lower opening, means for adjusting the capacity of the plunger, an outlet duct, and means for reciprocating the plunger, whereby either both openings communicate with the oil reservoir, or the lower opening communicates with the outlet duct, while the upper opening communicates with the outer air, substantially as specified.

3. A lubricator, comprising an oil reservoir, a lower perforated boss integral therewith and having an air opening and an outlet duct, a hollow plunger slidable in the boss and having an upper opening and a lower opening, and means for reciprocating the plunger, whereby either both plunger-openings communicate with the oil reservoir, or the lower opening communicates with the outlet duct, while the upper opening communicates with the boss-perforation, substantially as specified.

4. A lubricator, comprising an oil reservoir, a plunger-mechanism having a pair of axially alined pockets apertured near their outer ends, a pair of outlet ducts, and means for imparting reciprocating movement to the plunger-mechanism, whereby the aperture of one pocket is caused to communicate with an outlet duct, while the aperture of the other pocket is caused to communicate with the oil reservoir, substantially as specified.

Signed by me at New York city, (Manhattan,) N. Y., this 8th day of June, 1908.

LÜDER SCHRIEVER.

Witnesses:
 FRANK V. BRIESEN,
 W. R. SCHULZ.